US006543318B1

(12) United States Patent
Erickson (10) Patent No.: US 6,543,318 B1
(45) Date of Patent: Apr. 8, 2003

(54) LOCKING ASSEMBLY (75) Inventor: Robert A. Erickson, Raleigh, NC (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/998,952

(22) Filed: Nov. 15, 2001

(51) Int. Cl.[7] .................. B23B 3/00; B23B 29/00; B23C 7/00
(52) U.S. Cl. .................. 82/1.11; 82/160; 409/234
(58) Field of Search .................. 82/1.11, 160; 409/234, 409/232, 131; 411/412, 413; 279/67, 69, 83, 141, 155; 408/239 R, 240

(56) References Cited

U.S. PATENT DOCUMENTS

| | | | |
|---|---|---|---|
| 3,498,653 A | 3/1970 | McCreery | 287/119 |
| 4,018,132 A * | 4/1977 | Abe | 411/413 |
| 4,135,418 A | 1/1979 | McCray et al. | 82/36 |
| 4,197,771 A | 4/1980 | Heaton et al. | 82/36 |
| 4,202,650 A * | 5/1980 | Erickson | 407/46 |
| 4,350,463 A | 9/1982 | Friedline | 409/234 |
| 4,726,268 A * | 2/1988 | Erickson | 82/160 |
| 4,729,702 A * | 3/1988 | Kelm | 409/234 |
| 4,747,735 A | 5/1988 | Erickson et al. | 409/234 |
| 4,813,829 A * | 3/1989 | Koppelmann | 409/136 |
| 4,951,536 A * | 8/1990 | Robertson | 82/158 |
| 5,466,102 A * | 11/1995 | Erickson | 409/232 |
| 5,492,441 A * | 2/1996 | Schuerfeld | 409/234 |
| 5,609,454 A * | 3/1997 | Lee | 411/384 |
| 5,851,091 A * | 12/1998 | Klement | 409/232 |
| 5,873,682 A * | 2/1999 | Tripsa | 407/101 |
| 6,270,293 B2 * | 8/2001 | Erickson et al. | 407/101 |
| 6,276,880 B1 * | 8/2001 | Cirino et al. | 409/234 |

FOREIGN PATENT DOCUMENTS

AU    213464    *   5/1956   ................. 411/412

* cited by examiner

Primary Examiner—A. L. Wellington
Assistant Examiner—Brian D Walsh
(74) Attorney, Agent, or Firm—Larry R. Meenan (57) ABSTRACT

A locking assembly for a toolholder to releasably secure the toolholder with a tool support member.

28 Claims, 5 Drawing Sheets

LOCKING ASSEMBLY

BACKGROUND OF THE INVENTION

1. Field of the Invention

This invention relates to a locking assembly. More particularly, this invention relates to a locking assembly for a toolholder to releasably secure the toolholder with a tool support member.

2. Description of the Related Art

The present invention relates to a locking assembly for a toolholder for releasably holding tools with respect to a tool support member and a method of using the locking assembly.

The present invention is especially concerned with toolholders and support members wherein the support member has a bore for receiving the shank of the toolholder and the toolholder has a cutting insert seat on its forward end. Such articles are used in the cutting and shaping of workpieces where it is important that the toolholder be held by the tool support member in a rigid manner so that both movement and vibration are minimized during the metalcutting operation.

Many devices in the prior art have proven to be successful in this regard and are exemplified by McCreery U.S. Pat. No. 3,498,653; McCray et al. U.S. Pat. No. 4,135,418; Heaton et al. U.S. Pat. No. 4,197,771; and Friedline U.S. Pat. No. 4,350,463; incorporated herein by reference. The foregoing devices are concerned with the use of ball-like locking elements to hold the shank of a toolholder in the bore of the tool support member.

Although the prior art devices have been proven to perform satisfactorily, it will be appreciated that there is always a need for improved locking assemblies for toolholders, support members that provide an acceptable degree of rigidity during metal cutting operations such that a single assembly of toolholder, support member and locking members can be used in the widest possible variety of machining operations to provide a given surface finish in a heavier cut or a finer surface finish for a given depth of cut and feed rate.

SUMMARY OF THE INVENTION

Briefly, according to this invention, there is provided a locking assembly for a toolholder to releasably secure the toolholder with a tool support member and a combination of a locking assembly, toolholder and tool support member and a method of using the locking assembly, toolholder and tool support member.

The locking assembly includes a wedge screw including a generally longitudinally extending member having a threaded first end second end and a projection between the first and second end and extending from the member, wherein the first end is threaded in a direction opposite of the threads of the second end and wherein the number of threads per inch varies between the first end and the second end of the wedge screw; the wedge screw and a wedge member adapted to threadably engage each of the first and second end of the wedge screw, wherein the wedge members are rotatably fixed and axially movable along the wedge screw a controlled distance between a first position wherein the toolholder is locked with respect to the tool support member and a second position wherein the toolholder is released from the tool support member.

The toolholder includes a forward end, abutment face and a shank adjacent to and connected to the abutment face and extending rearwardly from the forward end. The shank includes a first section and a second section, wherein the second section is perforated by a first and a second perforation that are circumferentially spaced from each other and have a slot extending rearwardly of each of the perforations. The first and second perforations contain a lockable perforation having a lockable surface.

The tool support member includes a sidewall, a forwardly facing surface, a rearwardly facing surface, and a bore adapted to receive the shank of the toolholder, and a passageway in communication with the bore extending through the sidewall of the tool support member for receiving the locking assembly. The forwardly facing surface is engageable with the abutment face of the toolholder.

The method of locking and releasing a toolholder with respect to a tool support member using a locking assembly wherein the toolholder is locked with respect to the tool support member in a first position and the toolholder is released from the tool support member in a second position includes the steps of locking the toolholder with respect to the tool support member in the first position by threading the wedge screw into the wedge members thereby drawing the wedge members radially inwardly such that the wedge members contact the lockable surface around the lockable perforation within the shank of the toolholder thereby, and releasing the toolholder with respect to the tool support member in the second position by withdrawing the wedge screw from the wedge members and forcing the wedge members to move outwardly in opposite directions thereby unlocking the toolholder from the tool support member whereby the wedge members travel outwardly along the wedge screw within the passageway at different rates.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

It should be noted that in the description of the drawings, it is to be understood that such terms as "forward", "rearward", "left", "right", "upwardly", and "downwardly", and the like, are words of convenience and are not to be construed as limiting terms apart from the invention as claimed.

Referring to the drawings, wherein like reference characters represent like elements, there is shown a toolholder 10, tool support member 12 and locking assembly 14. The toolholder 10 holds a cutting tool (not shown) which cuts or shapes a workpiece of a type well known in the art. The toolholder 10 is mounted within and releasably secured in a rigid manner in the tool support member 12 by the locking assembly 14 which, in turn, is secured to a machine tool. While the toolholder 10, tool support member 12 and locking assembly 14 are preferably made from hardened and tempered steels, it will be clear to those of ordinary skill in the art that other materials may be substituted without detracting from the present invention as described herein.

In a preferred embodiment, the toolholder 10 includes a forward end with a pocket for receiving a cutting insert (not shown) therein. However, it should be understood that the term toolholder may encompass most any suitable configuration that is secured to the tool support member 12 through a shank and is not limited to a forward end incorporating a pocket for receiving a cutting insert. The toolholder 10 may include, by way of example and not limitation, a forward end having multiple insert seats such as may be found on a milling cutter. In addition, it will be appreciated that the forward end may also be a non-cutting tool (e.g., a die, ram, inspection device, fixture component, etc.).

Referring to FIGS. 2–6, the toolholder 10 includes a forward end 18, abutment face 22 and a shank 20 adjacent to and connected to the abutment face 22 and extending rearwardly away from the forward end. The abutment face 22 is designed for abutment with the forwardly facing surface 24 of the tool support member 12 on which the toolholder 10 is to be mounted. The abutment face 22 is preferably planar in nature and preferably defines a plane that is perpendicular to the longitudinal axis of symmetry of the shank 20.

The shank 20 is preferably an integral part of the toolholder 10. As shown in the figures, the shank 20 is illustrated as tubular with a conical shape; however, it will be appreciated that the shank 20 may have any number of different shapes (including square, rectangular, triangular and trochoidal) sufficient to connect with the tool support member more fully described below. Preferably, the shank 20 is machined from a single piece of steel. However, it is also contemplated that the shank 20 and the forward end of the toolholder 10 may be independent members that may be subsequently mechanically joined together with the rearwardly facing abutment face 22 being a part of the forward end of the shank. In this manner, a single shank 20 may be utilized with a variety of different toolholder forward ends or other tool components. For example, the shank 20 of the present invention may also be used in segments, extensions or assembly components of a modular tooling system. In fact, it is also envisioned that the shank may be formed of a plurality of segments to form a single coextensive shank.

The outer surfaces of the shank 20 may be divided into two sections, or in a preferred embodiment, the shank is of a continuous singular section of a conical shape. The first section has a first surface 26 of revolution about the longitudinal axis of symmetry which faces radially outwardly and tapers inwardly while extending rearwardly. As shown in the figures, preferably this first surface 26 of revolution is conical in nature.

Rearwardly of and joined to the first section 26 of the shank 20 is a second section 28 which is tubular in nature. The second section 28 has an outer surface which is a second surface of revolution located rearwardly and inwardly of the first surface of revolution. The second surface of revolution is preferably coaxial with the first surface of revolution and is preferably cylindrical in nature.

The tubular wall of the second section 28 of the shank 20 is perforated by a first and a second perforation 30 and 32 that are circumferentially spaced from each other, preferably at 180 degrees to each other. A slot 34 extends in a region rearwardly of each of the perforations 30 and 32. The first and second perforations 30 and 32 respectively contain a lockable perforation 38 and a releasable perforation 40. The lockable perforation 38 has a lockable surface 42.

For a more detailed description of a toolholder 10, reference is made to U.S. Pat. No. 6,270,293, incorporated herein by reference in its entirety.

Referring to FIGS. 1, and 7–14, the support member 12 is includes a sidewall 44, a forwardly facing surface 24, a rearwardly facing surface 48 and a bore 50 along a longitudinal axis L. It will be appreciated that the support member 12 may be of most any suitable shape such as cylindrical and the like. In a preferred embodiment, the forwardly facing surface 24 is engageable with an opposing complimentary shape rearwardly facing abutment face 22 of the toolholder 10. For example, the forwardly facing surface 24 and the rearwardly facing abutment face 22 may be, among other shapes, conical or planar and the like to fully contact one another. The bore 50 of the tool support member 12 extends rearwardly from the forwardly facing surface 24 of the tool support member in the direction of the rearwardly facing surface 48 for receiving the shank 20 of the toolholder 10. Formed in communication with the bore 50 and transverse of the tool support member 12 and through the sidewall 44 is a passageway 52.

Received within the passageway 52 is the locking assembly 14. The locking assembly 14 moves between a first position wherein the toolholder 10 is locked with respect to the tool support member 12 (FIGS. 7–10) and a second position wherein the toolholder is released from the tool support member (FIGS. 11–14).

Figure 1:
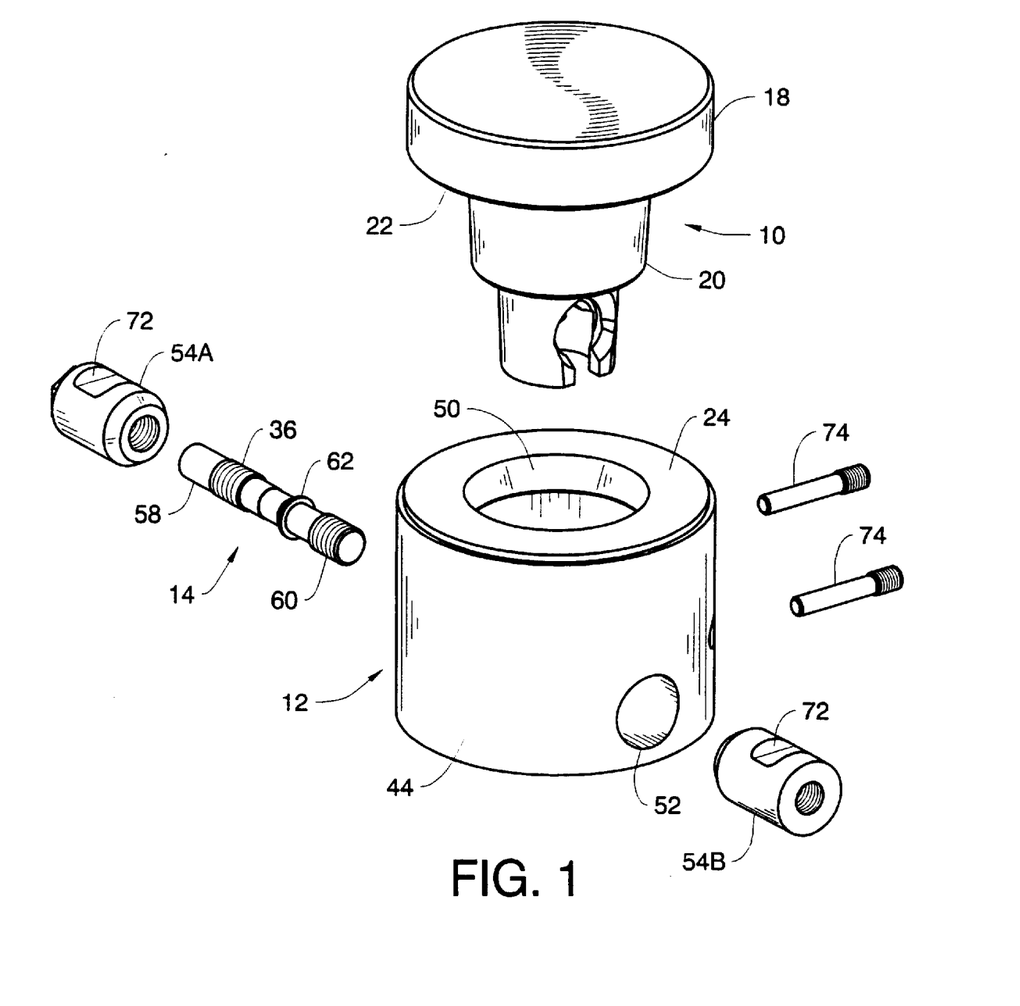
FIG. 1 is an exploded perspective view of a tool holder, a support member and locking assembly.
Figure 2:
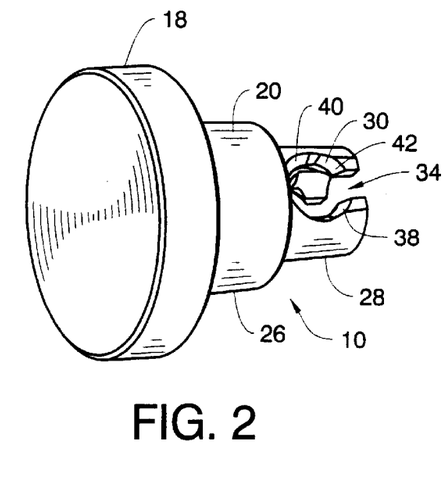
FIG. 2 is a perspective view of a tool holder.
Figure 3:
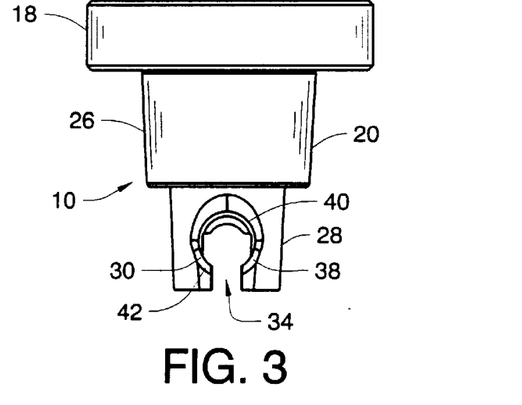
FIG. 3. is a side view of the tool holder of FIG. 2.
Figure 4:
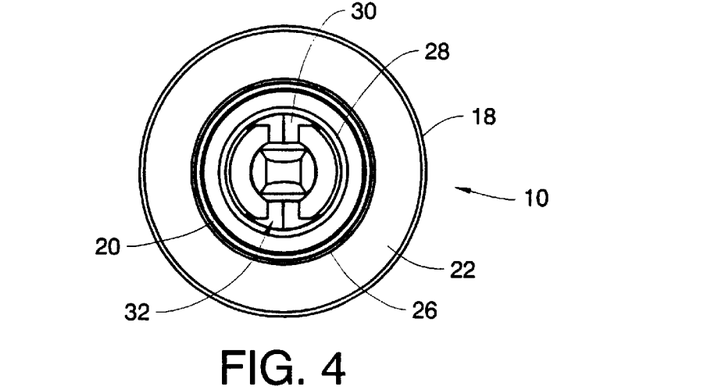
FIG. 4 is an end view of the tool holder of FIG. 3.
Figure 5:
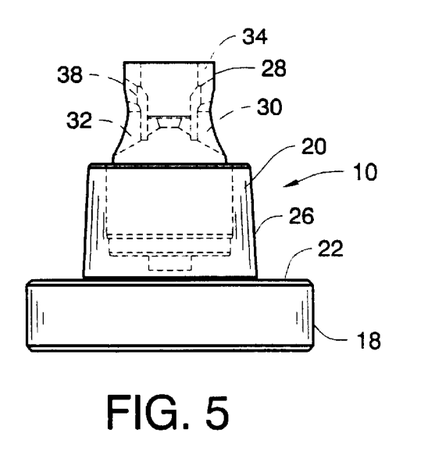
FIG. 5 is a side view of the tool holder of FIG. 3 rotated 90 degrees.
Figure 6:
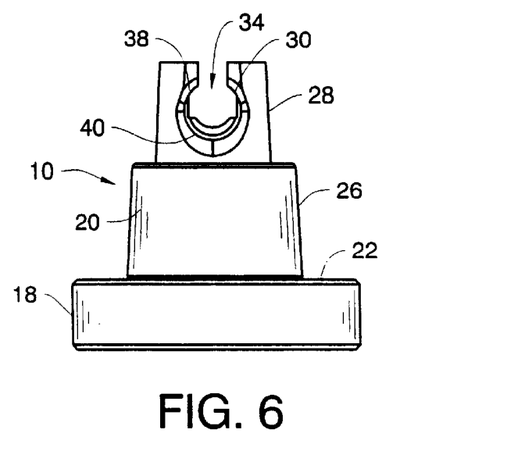
FIG. 6 is a side view of the tool holder of FIG. 5 rotated 90 degrees.
Figure 7:
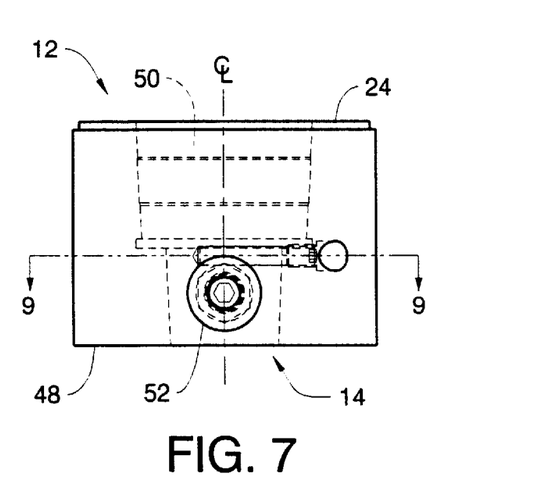
FIG. 7 is side view of the tool holder, a support member and locking assembly in the locked position.
Figure 8:
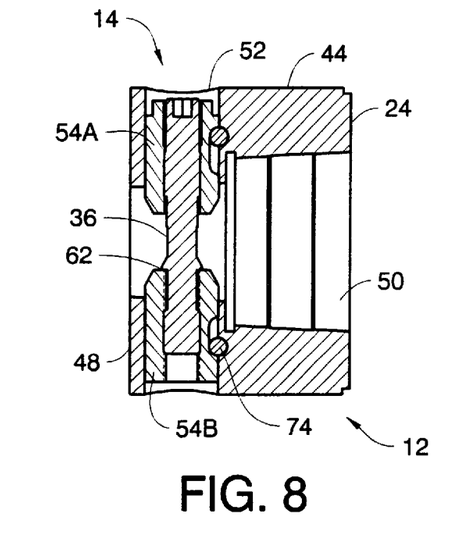
FIG. 8 is a cross sectional view of the tool holder, a support member and locking assembly of FIG. 10 taken along line 8—8.
Figure 9:
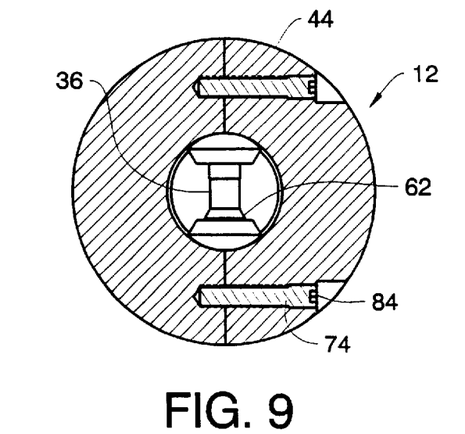
FIG. 9 is a cross sectional view of the tool holder, a support member and locking assembly of FIG. 7 taken along line 9—9.
Figure 10:
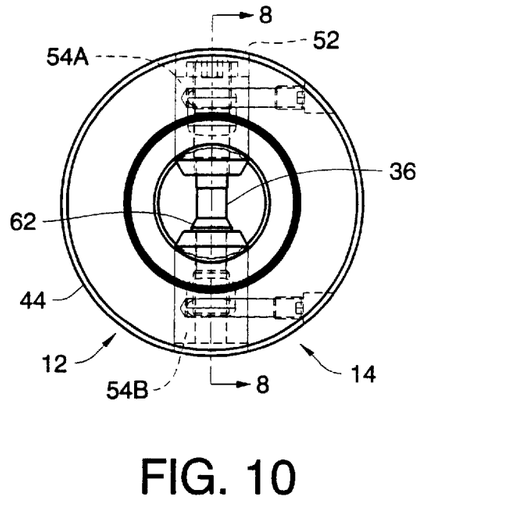
FIG. 10 is an end view of the tool holder, a support member and locking assembly of FIG. 7.
Figure 11:
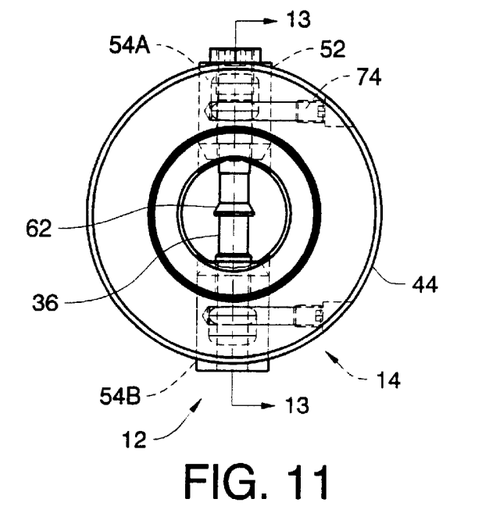
FIG. 11 is an end view of the tool holder, a support member and locking assembly of FIG. 14.
Figure 12:
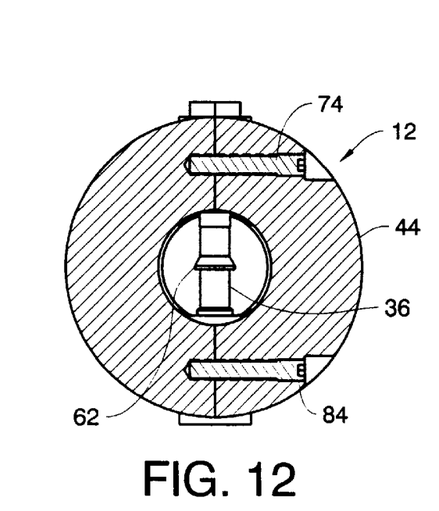
FIG. 12 is a cross sectional view of the tool holder, a support member and locking assembly of FIG. 14 taken along line 12—12.
Figure 13:
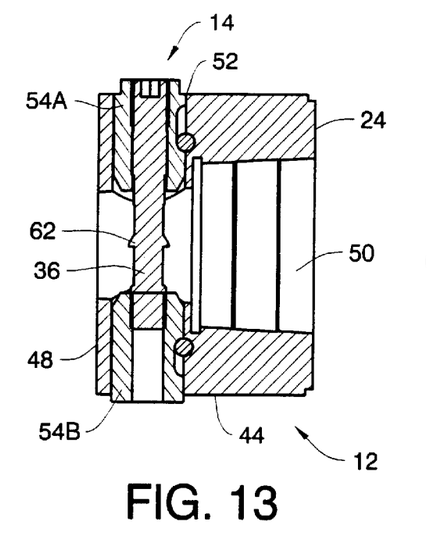
FIG. 13 is a cross sectional view of the tool holder, a support member and locking assembly of FIG. 11 taken along line 13—13.
Figure 14:
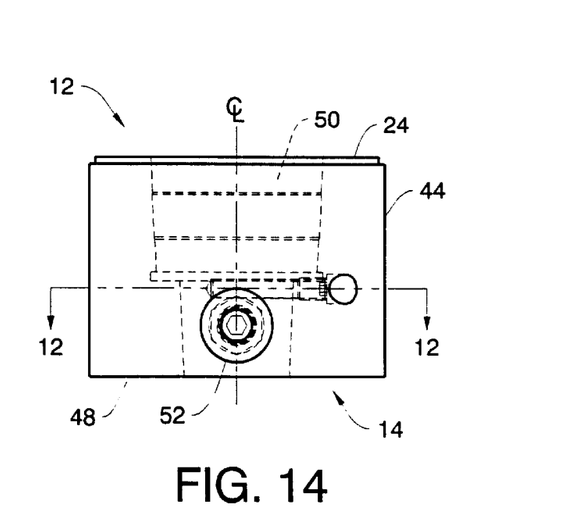
FIG. 14 is a side view of the tool holder, a support member and locking assembly in the unlocked position.
Figure 15:
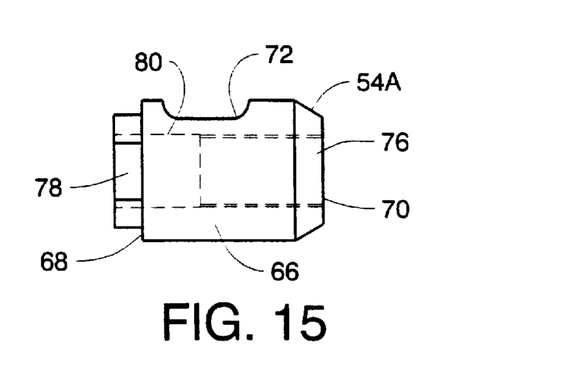
FIG. 15 is a side view of a wedge nut of the locking assembly.
Figure 16:
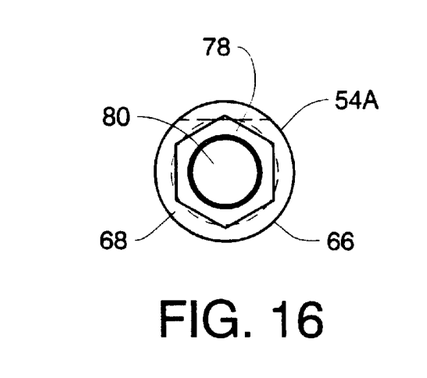
FIG. 16 is an end view of the wedge nut of FIG. 15.
Figure 17:
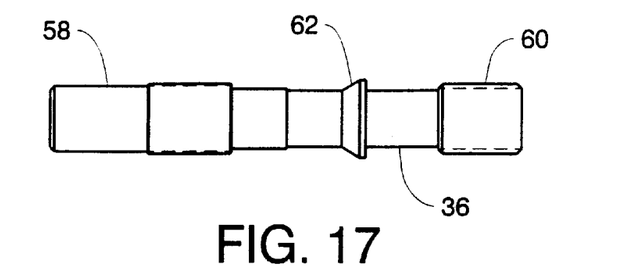
FIG. 17 is a side view of the wedge screw of the locking assembly.
Figure 18:
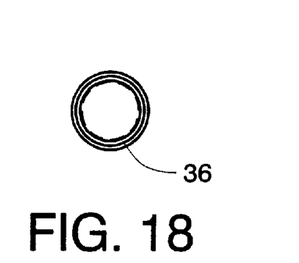
FIG. 18 is an end view of the wedge screw of FIG. 17.
Figure 19:
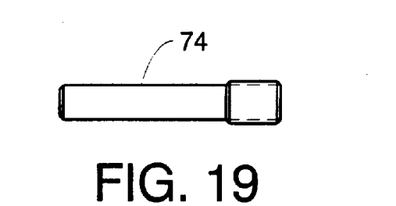
FIG. 19 is a side view of locking screw of the locking assembly.
Figure 20:
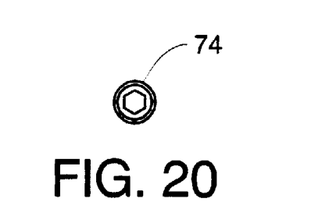
FIG. 20 is an end view of the locking screw of FIG. 19.
Figure 21:
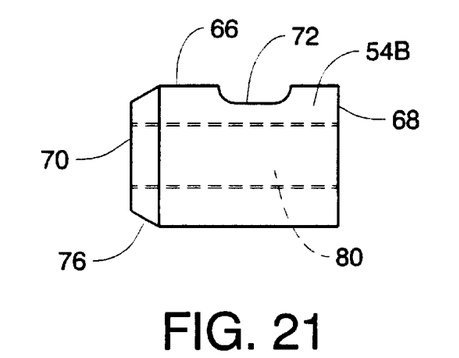
FIG. 21 is a side view of a wedge nut assembly of the locking assembly.
Figure 22:
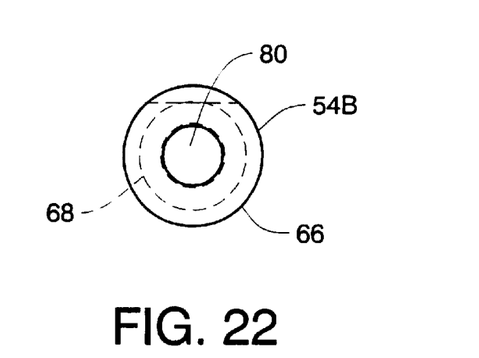
FIG. 22 is an end view of the wedge nut of FIG. 21.

Referring to the figures, the locking assembly 14 includes a wedge screw 36 (FIGS. 17 and 18) and wedge members 54a and 54b (FIGS. 15 and 16). The wedge screw 36 includes a generally longitudinally extending member having a threaded first end and second end 58 and 60. The first end 58 is threaded in a direction opposite of the threads of the second end 60. More particularly, the first end 58 includes left hand threads and the second end 60 includes right hand threads or vice a versa as the case may be. In addition, the number of threads per inch varies between each end 58 and 60 of the wedge screw 36. In a preferred embodiment, the first end 58 includes a fine thread pitch form and the second end 60 includes a coarse thread pitch form. In a most preferred embodiment, the first end includes a 32-pitch thread form and the second end 60 includes an 11-pitch thread form, respectively. Formed between the first end 58 and the second end 60 along the wedge screw 36 is a projection 62. Although as shown in FIG. 17 the projection 62 is illustrated as a raised conical surface, the projection may be most any raised surface that can function as an opposing surface to force the toolholder 10 from the tool support member 12 in the unlocked position as further described below.

Threaded on to each end of the wedge screw 36 are the wedge member 54a and 54b. The wedge members 54a and 54b are generally cylindrical members having a side surface 66, a rear face 68 and a front face 70. The side surface 66 includes a flat section 72 to receive a pin 74. The front face 70 includes a tapered portion 76 and the rear face 68 may include a hexagonal raised surface 78 to receive a suitable tool such as a wrench or the like to facilitate turning of the wedge member. It will be appreciated that the rear face 68 may include most any configuration, e.g., slot, hex socket, and the like to receive a suitable tool to assist in the assembly of the wedge member. A threaded bore 80 extends longitudinally from the front face 70 of the wedge members 54a and 54b. Each wedge member 54a and 54b is adapted to fit within the passageway 52 and threadably move along the wedge screw 36 within the passageway.

In operation, as the wedge screw 36 is turned clockwise, the wedge screw threads into both threaded bores 80 of the wedge members 54a and 54b thereby drawing the wedge members inwardly. As the wedge members 54a and 54b are moved in a radially inward direction, the tapered portion 76 of the wedge members contacts the lockable surface 42 around the lockable perforation 38 within the tubular shank 20 of the toolholder 10 thereby locking the toolholder with respect to the tool support member. More particularly, as illustrated in FIGS. 7–10, as the wedge members 54a and 54b are moved in a radially inward direction, the tapered portion 76 of the wedge members contacts the lockable surface 42 around the lockable perforation 38 and the forward half of the wedge member 54a and 54b clear and avoid contact with the forward half of the perforated portion of the releasable surface. In this fashion, all of the contact between the wedge members 54a and 54b and the lockable surface 42 occurs on the rearward half of the perforation 38 thereby providing a pull-back force upon the shank 20 within the bore 50 of the tool support member 12 securely holding the toolholder in a locked position. The wedge members 54a and 54b are rotatably fixed by a pin 74 extending through an opening 84 within the side surface 66 of the tool support member 12. The pin 74 contacts the flat section 72 thereby rotatably fixing the wedge member 54 with respect to the passageway 52. Furthermore, because the flat section 72 extends over a portion of the side surface 66 of the wedge members 54a and 54b, the wedge members may move axially within the passageway.

To release the toolholder 10 from a locked position to an unlocked position, the wedge screw 36 is turned in the opposite direction thereby withdrawing the wedge screw from the wedge members 54a and 54b and forcing the wedge members to move outwardly in opposite directions thereby unlocking the toolholder from the tool support member 12. It will be appreciated that because the thread pitch of the first end 58 and the second end 60 of the wedge screw 36 are different, the wedge member 54a travels outwardly and the wedge member 54b travels outwardly along the wedge screw within the passageway 52 at different rates. Consequently, as the wedge member 54b moves outwardly faster, the wedge member 54b contacts the pin 74 first before the wedge member 54a contacts the pin thereby forcing the projection 62 axially to the center and against the second section 28 of the toolholder 10 thereby ejecting the toolholder from the bore 50 of the tool support member 12.

It will be appreciated that the toolholder 10 and tool support member 12 may also include ball-like locking elements to also hold the shank 20 of the toolholder in the bore 50 of the toolholder as exemplified by McCreery U.S. Pat. No. 3,498,653; McCray et al. U.S. Pat. No. 4,135,418; Heaton et al. U.S. Pat. No. 4,197,771; and Friedline U.S. Pat. No. 4,350,463, incorporated herein by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A locking assembly for a toolholder to releasably secure the toolholder with a tool support member, the locking assembly comprising:

a wedge screw including a generally longitudinally extending member having a threaded first end and second end and a projection between the first and second end and extending from the member, wherein the first end is threaded in a direction opposite of the threads of the second end and wherein the number of threads per inch varies between the first end and the second end of the wedge screw; and a wedge member adapted to threadably engage each of the first and second of the wedge screw, wherein the wedge members are rotatably restrained in relation to the tool support member and axially movable along the wedge screw a controlled distance between a first position wherein the toolholder is locked with respect to the tool support member and a second position wherein the toolholder is released from the tool support member.

2. The locking assembly of claim 1 wherein the first end includes left hand threads and the second end includes right hand threads.

3. The locking assembly of claim 2 wherein the first end includes right hand threads and the second end includes left hand threads.

4. The locking assembly of claim 1 wherein the first end includes a 32-pitch thread form and the second end includes an 11-pitch thread form.

5. The locking assembly of claim 1 wherein the projection is a raised conical surface.

6. The locking assembly of claim 1 wherein the wedge members are cylindrical members having a side surface, a rear face and a front face, the side surface having a flat section.

7. The locking assembly of claim 6 wherein the front face includes a tapered portion.

8. The locking assembly of claim 6 wherein the rear face includes a hexagonal raised surface.

9. The locking assembly of claim 1 wherein the wedge members include a side surface having a flat section and are rotatably fixed by a pin extending through an opening within a side surface of the tool support member adjacent the flat section.

10. The combination of a toolholder, tool support member and locking assembly, the locking assembly capable of releasably securing the toolholder within the tool support member, the combination comprising:

a toolholder including a forward end, abutment face and a shank adjacent to and connected to the abutment face and extending rearwardly from the forward end; wherein the shank includes a first section and a second section, wherein the second section is perforated by a first and a second perforation that are circumferentially spaced from each other and having a slot extending rearwardly of each of the perforations, wherein the first and second perforations contain a lockable perforation having a lockable surface;

a tool support member including a sidewall, a forwardly facing surface, a rearwardly facing surface, and a bore adapted to receive the shank of the toolholder, a passageway in communication with the bore extending through the sidewall of the tool support member for receiving the locking assembly, the forwardly facing surface engageable with the abutment face of the toolholder; and a locking assembly including a wedge screw and wedge members, the wedge screw including a generally longitudinally extending member having a threaded first end and second end and a projection between the first and second end and extending from the member, the wedge screw adapted to axially move within the passageway, wherein the first end is threaded in a direction opposite of the threads of the second end and wherein the number of threads per inch varies between the first end and the second end of the wedge screw; the wedge screw and the wedge members each adapted to threadably engage the first and second end of the wedge screw, wherein the wedge members are rotatably restrained in relation to the tool support member and axially movable along the wedge screw a controlled distance between a first position wherein the toolholder is locked with respect to the tool support member and a second position wherein the toolholder is released from the tool support member.

11. The combination of claim 10 wherein the abutment face is a planar surface.

12. The combination of claim 11 wherein the abutment face is perpendicular to a longitudinal axis of the shank.

13. The combination of claim 10 wherein the shank is formed integral with the toolholder.

14. The combination of claim 10 wherein the shank includes a first section having a first surface of revolution about a longitudinal axis of symmetry of the shank.

15. The combination of claim 14 wherein the first surface is conical.

16. The combination of claim 14 wherein the shank includes a second section joined rearwardly to the first section of the shank.

17. The combination of claim 16 wherein the second section is tubular.

18. The combination of claim 10 wherein the first end includes left hand threads and the second end includes right hand threads.

19. The locking assembly of claim 18 wherein the first end includes right hand threads and the second end includes left hand threads.

20. The locking assembly of claim 10 wherein the first end includes a 32-pitch thread form and the second end includes an 11-pitch thread form.

21. The locking assembly of claim 10 wherein the first end includes a 32-pitch thread form and the second end includes an 11-pitch thread form.

22. The locking assembly of claim 10 wherein the projection is a raised conical surface.

23. The locking assembly of claim 10 wherein the wedge members are cylindrical members having a side surface, a rear face and a front face, the side surface having a flat section.

24. The locking assembly of claim 23 wherein the front face includes a tapered portion.

25. The locking assembly of claim 23 wherein the rear face includes a hexagonal raised surface.

26. The locking assembly of claim 10 wherein the wedge members include a side surface having a flat section and are rotatably fixed by a pin extending through an opening within a side surface of the tool support member adjacent the flat section.

27. A method of locking and releasing a toolholder with respect to a tool support member using a locking assembly wherein the toolholder is locked with respect to the tool support member in a first position and the toolholder is released from the tool support member in a second position, the toolholder including a forward end, abutment face and a shank adjacent to and connected to the abutment face and extending rearwardly from the forward end; wherein the shank includes a first section and a second section, wherein the second section is perforated by a first and a second perforation that are circumferentially spaced from each other and having a slot extending rearwardly of each of the perforations, wherein the first and second perforations contain a lockable perforation having a lockable surface; the tool support member including a sidewall, a forwardly facing surface, a rearwardly facing surface, and a bore adapted to receive the shank of the toolholder, a passageway in communication with the bore extending through the sidewall of the tool support member for receiving the locking assembly, the forwardly facing surface engageable with the abutment face of the toolholder; and the locking assembly including a wedge screw and wedge members, the wedge screw including a generally longitudinally extending member having a threaded first end and second end and a projection between the first and second end and extending from the member, the wedge screw is axially and rotatably movable within the passageway, wherein the first end is threaded in a direction opposite of the threads of the second end and wherein the number of threads per inch varies between the first end and the second end of the wedge screw; the wedge members engage the first and second end of the wedge screw and are rotatably restrained in relation to the tool support member and axially movable along the wedge screw a controlled distance, wherein the wedge members include a side surface having a flat section and are rotatably fixed by a pin extending through an opening within a side surface of the tool support member adjacent the flat section, the method comprising the steps of:

locking the toolholder with respect to the tool support member in the first position by threading the wedge screw into the wedge members thereby drawing the wedge members radially inwardly such that the wedge members contact the lockable surface around the lockable perforation within the shank of the toolholder thereby; and releasing the toolholder with respect to the tool support member in the second position by withdrawing the wedge screw from the wedge members and forcing the wedge members to move outwardly in opposite directions thereby unlocking the toolholder from the tool support member whereby the wedge members travel outwardly along the wedge screw within the passageway at different rates.

28. The method of claim 27 further comprising the step of contacting one wedge member against the pin before the other wedge member contacts the pin thereby forcing the projection axially to the center and against the toolholder thereby ejecting the toolholder from the bore of the tool support member.

* * * * *